(12) United States Patent
Limberg

(10) Patent No.: US 9,507,924 B2
(45) Date of Patent: *Nov. 29, 2016

(54) USER AUTHENTICATION

(71) Applicant: INTERNATIONAL BUSINESS MACHINES CORPORATION, Armonk, NY (US)

(72) Inventor: Jared A. Limberg, Shaker Heights, OH (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/830,027

(22) Filed: Aug. 19, 2015

(65) Prior Publication Data

US 2015/0356284 A1 Dec. 10, 2015

Related U.S. Application Data

(63) Continuation of application No. 14/150,867, filed on Jan. 9, 2014, now Pat. No. 9,147,056.

(51) Int. Cl.
| | |
|---|---|
| *G06F 21/00* | (2013.01) |
| *G06F 21/31* | (2013.01) |
| *H04L 29/06* | (2006.01) |
| *G06F 21/36* | (2013.01) |
| *G06F 21/45* | (2013.01) |

(52) U.S. Cl.
CPC ............. *G06F 21/31* (2013.01); *G06F 21/36* (2013.01); *G06F 21/45* (2013.01); *H04L 63/083* (2013.01)

(58) Field of Classification Search
CPC ...... G06F 21/30; G06F 21/31; G06F 21/316; G06F 21/45; G06F 21/46; H04L 63/083
See application file for complete search history.

(56) References Cited

U.S. PATENT DOCUMENTS

| | | |
|---|---|---|
| 9,147,056 B2 | 9/2015 | Limberg |
| 2005/0229000 A1 | 10/2005 | Shoji et al. |
| 2006/0136737 A1* | 6/2006 | Bauchot ................. G06F 21/31 713/183 |
| 2006/0271790 A1 | 11/2006 | Chen |
| 2008/0209222 A1 | 8/2008 | Narayanaswami et al. |
| 2015/0193608 A1 | 7/2015 | Limberg |

FOREIGN PATENT DOCUMENTS

WO   2004/021108   3/2004

OTHER PUBLICATIONS

Anonymous; A More Secure and Effective Password Policy; IPCOM000215213D; IP.com Electronic Publication date Feb. 22, 2012; 6 pages.
Lamport, Leslie; Password Authentication with Insecure Communication; Communication of the ACM; vol. 24, No. 11; Nov. 1981; pp. 770-772.

(Continued)

*Primary Examiner* — Edward Zee
(74) *Attorney, Agent, or Firm* — Schmeiser, Olsen & Watts; William H. Hartwell

(57) ABSTRACT

A method and system for authenticating a user is provided. The method includes receiving keyboard entries from a user while a cursor of a computer screen is positioned in a password field of the user. The keyboard entries include a series of alphanumeric characters forming part of a password of the user and one or more function keys that either delete one or more of the alphanumeric characters or do not affect the alphanumeric characters as entered into the password field. The key board entries are logged. The logged keyboard entries checked to determine whether they match a stored valid password for the user such that the one or more function keys that either delete one or more of the alphanumeric characters or do not affect the alphanumeric characters are considered part of the submitted password which is compared to the stored valid password for authentication of the user.

20 Claims, 9 Drawing Sheets

| User Sees | Entry Being Auhenticated | Description |
|---|---|---|
| Multiple options usage | | |
| Step 1: computer I | Step 1: "computer" | Step 1: enter "computer" |
| Step 2: compute I r | Step 2: <BACK ARROW> | Step 2: moves the cursor key one character back with the back arrow key |
| Step 3: comput I er | Step 3: <BACK ARROW> | Step 3: moves the cursor key one character back with the back arrow key |
| Step 4: compu I er | Step 4: <BACKSPACE> | Step 4: removes the "t" |
| Step 5: compust I er | Step 5: "st" | Step 5: enters "st" |
| Step 6: compust I er I | Step 6: <Shift> | Step 6: enters SHIFT key |

601

(56) References Cited

OTHER PUBLICATIONS

Office Action (Mail Date Feb. 13, 2015) for U.S. Appl. No. 14/150,867, filed Jan. 9, 2014.

Amendment filed May 5, 2015 in response to Office Action (Mail Date Feb. 13, 2015) for U.S. Appl. No. 14/150,867, filed Jan. 9, 2014.

Notice of Allowance (Mail Date May 26, 2015) for U.S. Appl. No. 14/150,867, filed Jan. 9, 2014.

* cited by examiner

| Example Replacement |
|---|
| computer←r<br>or<br>c←computer<br>or<br>comp←puter<br>and so on. |
| computex←r<br>or<br>x←computer<br>or<br>comx←puter<br>and so on. |
| oomputey←r<br>or<br>y←computer<br>or<br>comy←puter<br>and so on. |

201a — first row
201b — second row
201c — third row

| Example |
|---|
| Sequence Shortening |
| computer ←<br>or<br>c ← omputer<br>or<br>comp ← uter<br>and so on. | — 301a
| computex ←<br>or<br>x ← omputer<br>or<br>comx ← uter<br>and so on. | — 301b
| computey ←<br>or<br>y ← omputer<br>or<br>comy ← uter<br>and so on. | — 301c

FIG. 3B

| Example |
|---|
| Sequence Shortening |
| computer ← rr<br>or<br>c ← ccomputer<br>or<br>comp ← pputer<br>and so on. | — 304a
| computex ← rr<br>or<br>x ← ccomputer<br>or<br>comx ← pputer<br>and so on. | — 304b
| computey ← rr<br>or<br>y ← ccomputer<br>or<br>comy ← pputer<br>and so on. | — 304c

| | |
|---|---|
| | Example |
| | Sequence Lengthening (pre) using duplicate entry |
| 310a | computerr ←<br>or<br>cc ← omputer<br>or<br>comp ← puter<br>and so on. |
| 310b | computexx ←<br>or<br>xx ← omputer<br>or<br>comx ← uter<br>and so on. |
| 310c | computeyy ←<br>or<br>yy ← omputer<br>or<br>comyy ← uter<br>and so on. |

FIG. 3C

| Example |
|---|
| Single Reposition using input device after entry |
| Step 1: computer \|<br>Step 2: comp \| uter |
| Multiple Reposition using input device after entry |
| Step 1: computer \|<br>Step 2: comp \| uter<br>Step 3: computer \| |
| Reposition using input device after entry with additional entry |
| Step 1: Computer \|<br>Step 2: Comp \| uter<br>Step 3: Compz \| uter |
| Step 1: Comp \|<br>Step 2: C \| omp<br>Step 3: Cr \| omp<br>Step 4: Cromp \|<br>Step 5: Computer \| |

| | |
|---|---|
| | Example |
| | Single Reposition using arrow keys after entry |
| 501a | Step 1: computer \| <br> Step 2: compute \| r <br> Step 3: comput \| er <br> Step 4 compu \| ter <br> Step 5: comp \| uter |
| | Multiple Reposition using arrow keys after entry |
| 501b | Step 1: computer \| <br> Step 2: compute \| r <br> Step 3: comput \| er <br> Step 4 compu \| ter <br> Step 5: comp \| uter <br> Step 6: compu \| ter <br> Step 7: comput \| er <br> Step 8 compute \| r <br> Step 9: computer \| |
| | Reposition using arrow keys after entry wth additional entry |
| 501c | Step 1: computer \| <br> Step 2: compute \| r <br> Step 3: comput \| er <br> Step 4 compu \| ter <br> Step 5: comp \| uter <br> Step 6: compz \| uter |
| | Step 1: comp \| <br> Step 2: comp \| p <br> Step 3: co \| mp <br> Step 4 c \| omp <br> Step 5: cr \| omp <br> Step 6: cro \| mp <br> Step 7: com \| p <br> Step 8 cromp \| <br> Step 9: cromputer \| |

FIG. 5

| User Sees | Entry Being Auhenticated | Description |
|---|---|---|
| Multiple options usage | | |
| Step 1: computer \| | Step 1: "computer" | Step 1: enter "computer" |
| Step 2: compute \| r | Step 2: <BACK ARROW> | Step 2: moves the cursor key one character back with the back arrow key |
| Step 3: comput \| er | Step 3: <BACK ARROW> | Step 3: moves the cursor key one character back with the back arrow key |
| Step 4: compu \| er | Step 4: <BACKSPACE> | Step 4: removes the "t" |
| Step 5: compust \| er | Step 5: "st" | Step 5: enters "st" |
| Step 6: compust \| er \| | Step 6: <Shift> | Step 6: enters SHIFT key |

USER AUTHENTICATION

This application is a continuation application claiming priority to Ser. No. 14/150,867 filed Jan. 9, 2014, now U.S. Pat. No. 9,147,056 issued Sep. 29, 2015.

FIELD

The present invention relates generally to user authentication to a computer system or computer program, and more specifically to obfuscating a password as it is entered via a keyboard in case a hacker is watching the keyboard entry of the password.

BACKGROUND

Strong passwords are difficult to remember, and hackers and associated tools are becoming increasingly savvy in calculating user passwords. The use of characters for generating passwords for authentication of a user are well known. A known technique disclosed in World Patent No. WO2004021108-A2 uses "ghost" characters in a password in case a hacker is watching the keyboard entry of a password by the rightful owner. The "ghost" characters are entered during a pause portion of the password but are not included in comprised by the actual password. The "ghost" characters serve to disguise the actual password from the onlooker. Another known technique disclosed in U.S. Patent Application No. 20080209222-A1 uses a long password to decrypt data stored on a mobile device. A code reader assigns the long password to an input for a device. Accordingly, an object of the present invention is to protect a password by obfuscating keyboard entry of the password in case a hacker is watching.

SUMMARY

An embodiment of the present invention comprises a method, system and program product for authenticating a user. While a password field of a computer screen is active to receive keyboard entries from a user, keyboard entries are received from the user. The key board entries comprise (a) a series of alphanumeric characters forming part of a password of the user and (b) one or more function keys that either delete one or more of the alphanumeric characters or do not affect the alphanumeric characters as entered into the password field. The key board entries of (a) and (b) made during entry of the password of the user into the password field are logged. Next, the user submits the password entered into the password field for authentication, and in response, a program determines whether the logged keyboard entries of (a) and (b) match a stored, valid password for the user. The program considers the one or more function keys that either delete one or more of the alphanumeric characters or do not affect the alphanumeric characters as part of the submitted password which is compared to the stored valid password for authentication of the user.

The present invention advantageously provides a simple method and associated system capable of more accurately enhancing user authentication.

BRIEF DESCRIPTION OF THE DRAWINGS

FIG. 2 illustrates implementation examples associated with usage of a back space key for performing an authentication process associated with character replacement, in accordance with embodiments of the present invention.

FIG. 3A illustrates implementation examples associated with usage of a back space key for performing a sequence shortening authentication process associated with character replacement, in accordance with embodiments of the present invention FIG. 3B illustrates implementation examples associated with usage of a back space key for performing a post sequence lengthening authentication process using a duplicate entry associated with character replacement, in accordance with embodiments of the present invention.

FIG. 3C illustrates implementation examples associated with usage of a back space key for performing a pre-sequence lengthening authentication process using a duplicate entry associated with character replacement, in accordance with embodiments of the present invention.

FIG. 4 illustrates implementation examples associated with repositioning a curser using an input device such as a mouse for performing a repositioning authentication process, in accordance with embodiments of the present invention.

FIG. 5 illustrates implementation examples associated with repositioning a curser using arrow keys of an input device for performing a repositioning authentication process, in accordance with embodiments of the present invention.

FIG. 6 illustrates an implementation example associated with an invisible curser with respect to a multiple options usage process, in accordance with embodiments of the present invention.

DETAILED DESCRIPTION OF THE PREFERRED EMBODIMENTS

Figure 1:
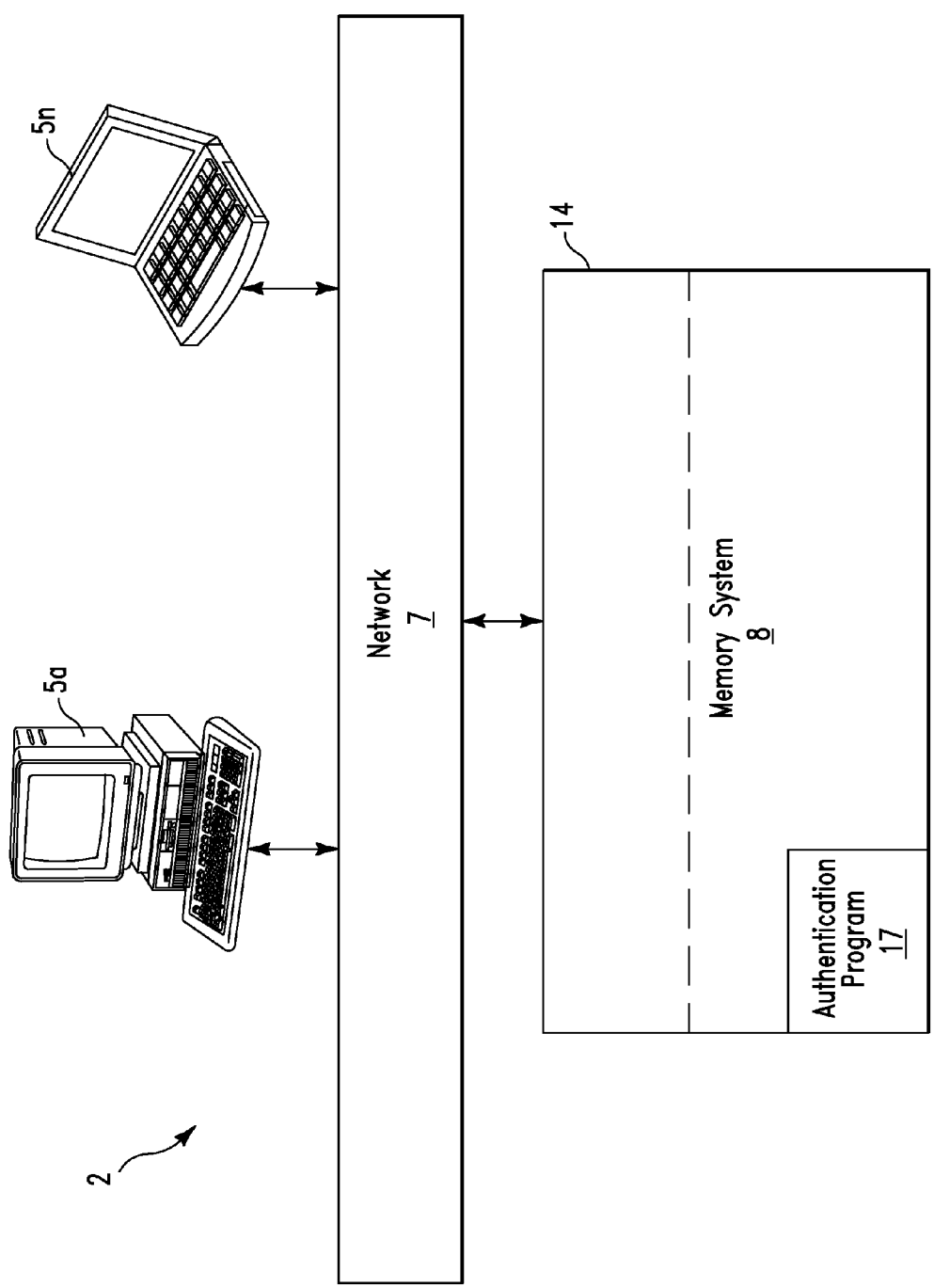
FIG. 1 illustrates a system for enhancing a user authentication process, in accordance with embodiments of the present invention.

FIG. 1 illustrates a system 2 for enhancing a user authentication process, in accordance with embodiments of the present invention. System 2 of FIG. 1 enables a process generating a password (or user name) that includes a sequence of characters and at least one keyboard function that does not appear in a final password transmitted to an application for authentication. For example, a password may be generated requiring entry of characters A, B, and C and subsequently a deletion of the C via a backspace then an entry of a character D. A keystroke logger records A, B, C, delete C, and D, and this entire sequence, including the entry of "C" followed by the deletion of "C" is the actual password. Therefore, if another person is looking over the shoulder of the user entering the password, the person may view the entry of the "C" followed by its deletion to mean that the entry of the C was an error and the actual password is simply "A, B, D". This helps to protect the actual password from detection by an onlooker.

System 2 of FIG. 1 includes computers 5a . . . 5n connected through a network 7 to a computing system 14. Network 7 may include any type of network including, inter alia, a local area network, (LAN), a wide area network (WAN), the Internet, a wireless network, etc. Computers 5a . . . 5n may include any type of computing system(s) including, inter alia, a computer (PC), a laptop computer, a tablet computer, a server, a PDA, a smart phone, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes an authentication program 17 comprising a keystroke logger for enhancing a user authentication process.

System 2 utilizes a backspace key or any key (with or without use of a mouse) that deletes a previous entered alphanumeric symbol thereby enabling the backspace key and/or delete key to become a part of the password itself. Authentication program 17 verifies the password such that the password acknowledges the backspace key and delete key upon entry. Alternatively, authentication program 17 may wait until the full password is completed and determine where and when the backspace or delete key was used. Therefore, system 2 enables the following functional abilities with respect to password (or user name) entry associated with an authentication process:
1. An ability to include any no-delete keys such as, inter alia, alt/function keys/etc.
2. An ability to reposition a cursor and insert the curser as part of a password sequence.
3. An ability to utilize arrow keys are part of a password sequence.
4. An ability to utilize keyboard and soft key (e.g., touch screen keyboards) sequences.
5. An ability to utilize a specialized keyboard, mapped keyboard, a UI soft keyboard, etc.

System 2 enables usage of any input device (e.g., a keyboard, a mouse, a touch screen input device, a virtual input device, etc.) function such as, inter alia, a backspace key, a delete key, a repositioning of a cursor, etc. as an element of entry (in addition to alpha/numeric characters) for a password or user name in an authentication process. Additionally, system 2 may enable usage of the flowing alternative input device functions as an element of entry (in addition to alpha/numeric characters) for a password or user name in an authentication process.
1. Usage of arrow keys to reposition cursor to a specified position.
2. Usage of arrow keys to permit other variables of element entry.
3. Usage of invisible characters into a password or user name entry. For example, a shift key function may be used as an element of input into a password or user name entry.
4. Any non-character producing key or sequence of keys may be used as an element of input into a password or user name entry.

System 2 may be programmed to enable or disable (on demand) usage of any of the aforementioned input device functions. Additionally, system 2 may be programmed to force a requirement of usage for any of the aforementioned input device functions.

FIG. 2 illustrates implementation examples 201a . . . 201c associated with usage of a back space key for performing an authentication process associated with character replacement, in accordance with embodiments of the present invention. Implementation example 201a describes an authentication process for removal of one previously entered correct symbol in a sequence followed by re-entry of the same previously entered symbol to complete a proper sequence with respect to the password "computer". Implementation example 201b describes an authentication process for removal of a previously entered random symbol "x" (or any symbol except a correct symbol) in a sequence followed by entry of a correct symbol to complete a proper sequence with respect to the password "computer". Implementation example 201c describes an authentication process for removal of previously entered known symbol "y" (or any symbol except a correct symbol) in a sequence followed by entry of a correct symbol to complete the proper sequence with respect to the password "computer". A known symbol comprises an initially configured symbol.

FIG. 3A illustrates implementation examples 301a . . . 301c associated with usage of a back space key for performing a sequence shortening authentication process associated with character replacement, in accordance with embodiments of the present invention. Implementation example 301a describes an authentication process for removal of one previously entered correct symbol in a sequence followed by entry of the remainder of the proper sequence except a symbol representing the previously entered correct symbol. Implementation example 301b describes an authentication process for removal of a previously entered random symbol "x" (or any symbol except a correct symbol) in a sequence followed by entry of the remainder of the proper sequence except a symbol representing the random symbol. Implementation example 301c describes an authentication process for removal of a previously entered known symbol "y" in a sequence followed by entry of the remainder of the proper sequence except a symbol representing the known symbol.

FIG. 3B illustrates implementation examples 304a . . . 304c associated with usage of a back space key for performing a post sequence lengthening authentication process using a duplicate entry associated with character replacement, in accordance with embodiments of the present invention. Implementation example 304a describes an authentication process for removal of one previously entered correct symbol in a sequence followed by re-entry of the same previously entered symbol to complete a proper sequence. Implementation example 304b describes an authentication process for removal of a previously entered random symbol "x" in a sequence followed by entry of a correct symbol to complete a proper sequence. Implementation example 304c describes an authentication process for removal of a previously entered known symbol "y" in a sequence followed by entry of a correct symbol to complete the proper sequence.

FIG. 3C illustrates implementation examples 310a . . . 310c associated with usage of a back space key for performing a pre-sequence lengthening authentication process using a duplicate entry associated with character replacement, in accordance with embodiments of the present invention. Implementation example 310a describes an authentication process for removal of one previously entered correct symbol in a sequence followed by entry of the remainder of the proper sequence except a symbol representing the previously entered correct symbol. Implementation example 310b describes an authentication process for removal of a previously entered random symbol "x" in a sequence followed by entry of a remainder of a proper sequence except a symbol representing the random symbol. Implementation example 310c describes an authentication process for removal of previously entered known symbol "y" in a sequence followed by entry of a remainder of a proper sequence except a symbol representing the known symbol.

Additional examples with respect to FIGS. 3A . . . 3C may include blending correct, random, and known symbols whenever two or more symbols are introduced in a pre, post, or blended pre and post situation. Additionally, usage of more than one backspace function may provide additional alternatives (e.g., deleting first then third characters, deleting third then first characters, etc.).

FIG. 4 illustrates implementation examples 401a ... 401c associated with repositioning a curser using an input device such as a mouse for performing a repositioning authentication process, in accordance with embodiments of the present invention. Implementation example 401a describes an authentication process for a single repositioning of a curser after entry of the password "computer". The curser is repositioned between a "p" and a "u". Implementation example 401b describes an authentication process for a multiple repositioning of a curser after entry of the password "computer". The curser is repositioned between a "p" and a "u" and subsequently repositioned back to the end of the password. Implementation example 401c describes an authentication process for a repositioning of a curser after entry of the password "computer" and an additional entry. The curser is repositioned between a "p" and a "u" and subsequently a "z" is entered. Alternatively, the characters "comp" may be entered and the curser may be repositioned between the "c" and "o" and subsequently "r" is entered followed by a repositioning of the curser to an end of "comp" followed by entry of "uter".

FIG. 5 illustrates implementation examples 501a ... 501c associated with repositioning a curser using arrow keys of an input device for performing a repositioning authentication process, in accordance with embodiments of the present invention. Implementation example 401a describes an authentication process for a single repositioning of a curser using arrow keys after entry of the password "computer". The curser is repositioned between a "p" and a "u" by enabling the back arrow key four times in sequence. Implementation example 401b describes an authentication process for a multiple repositioning of a curser using arrow keys after entry of the password "computer". The curser is repositioned between a "p" and a "u" and subsequently repositioned back to the end of the password by enabling the forward arrow key four times in sequence. Implementation example 401c describes an authentication process for a repositioning of a curser using arrow keys after entry of the password "computer" and an additional entry. The curser is repositioned between a "p" and a "u" by enabling the back arrow key four times in sequence and subsequently a "z" is entered. Alternatively, the characters "comp" may be entered and the curser may be repositioned between the "c" and "o" by enabling the back arrow key three times in sequence and subsequently a "r" is entered followed by a repositioning of the curser to an end of "comp" by enabling the forward arrow key three times in sequence followed by entry of "uter".

FIG. 6 illustrates an implementation example 601 associated with an invisible curser with respect to a multiple options usage process, in accordance with embodiments of the present invention. Implementation example 601 describes an authentication process comprising the following steps:
1. The term "computer" is entered.
2. A cursor key is moved one character back using a back arrow key.
3. A cursor key is moved an additional character back using a back arrow key
4. A character "t" is removed.
5. Characters "st" are entered.
6. A shift key is enabled.

Although a user is only able to view the phrase "compuster" on the screen (or * if characters are hidden), the entry actually comprises: computer<BACK ARROW><BACKARROW><BACKSPACE>st<SHIFT>.

Figure 7:
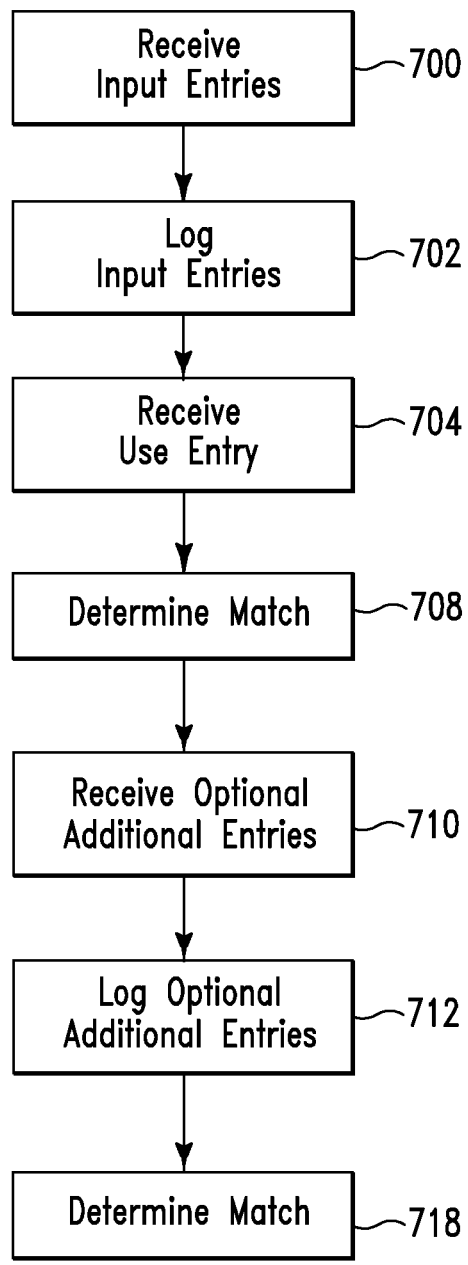
FIG. 7 illustrates an algorithm detailing a process flow enabled by the system of FIG. 1 enhancing a user authentication process, in accordance with embodiments of the present invention.

FIG. 7 illustrates the steps performed by the authentication program 17 for enhancing a user authentication process, in accordance with embodiments of the present invention. Each of the steps in the algorithm of FIG. 7 may be enabled and executed in any order by a computer processor executing computer code. In step 700, identification program 17 (see FIG. 1) receives keyboard (or any input device) entries (while a cursor of a computer screen is positioned in a password field of a user) from the user that include (a) a series of alphanumeric characters forming part of a password of the user and (b) one or more function keys (i.e., not entered in the password field) that either delete one or more of the alphanumeric characters or do not affect the alphanumeric characters as entered into the password field. The keyboard entries may be received via a single keyboard, a plurality of differing keyboards (hardware, virtual, etc.), a mouse, etc. The keyboard entries may be received in any order. In step 702, identification program 17 logs the keyboard entries. Logging keyboard entries comprises an action that includes recording (or logging) keys struck on a keyboard, typically in a covert manner such that a user using the keyboard is unaware that their actions are being monitored. Numerous key logging methods may be used including, inter alia, hardware and software-based approaches to acoustic analysis. Key logging methods may comprise, inter alia: hypervisor-based key logging methods, kernel based key logging methods, API based key logging methods, form grabbing based key logging methods, memory injection based key logging methods, packet analyzer based key logging methods, etc. In step 704, identification program 17 receives a user entry to submit the password entered into the password field. In step 708, identification program 17 subsequently determines whether the logged keyboard entries of step 702 match a stored, valid password for the user such that the one or more function keys that either delete one or more of the alphanumeric characters or do not affect the alphanumeric characters are considered part of the submitted password which is compared to the stored valid password for authentication of the user. In step 710, authentication program 17 may optionally receive multiple additional keyboard (or any input device) entries associated with the password and/or a user name. In step 712, identification program 17 logs the multiple additional keyboard entries. In step 718, identification program 17 subsequently determines whether the logged keyboard entries of step 712 match a stored, valid password for the user such that the one or more function keys that either delete one or more of the alphanumeric characters or do not affect the alphanumeric characters are considered part of the submitted password which is compared to the stored valid password for authentication of the user.

Figure 8:
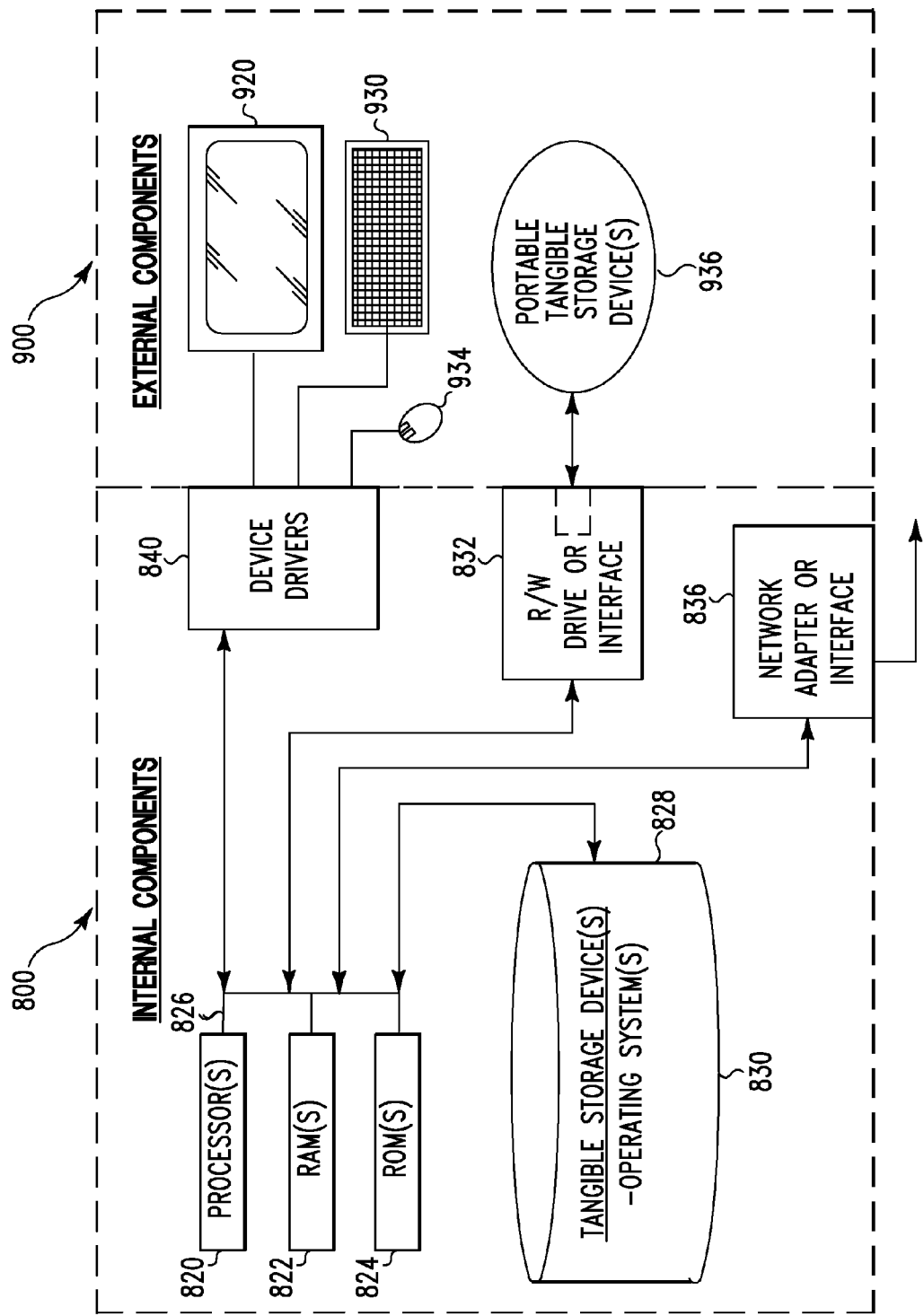
FIG. 8 illustrates a computer apparatus used by the system of FIG. 1 for enhancing a user authentication process, in accordance with embodiments of the present invention.

FIG. 8 illustrates a computer apparatus 800 (e.g., computer 14 of FIG. 1) used by system 2 of FIG. 1 for enhancing a user authentication process, in accordance with embodiments of the present invention. Computer 14 includes a set of internal components 800 and external components 900, illustrated in FIG. 8. The set of internal components 800 includes one or more processors 820, one or more computer-readable RAMs 822 and one or more computer-readable ROMs 824 on one or more buses 826, one or more operating systems 828 and one or more computer-readable storage devices 830. The one or more operating systems 828 and program instructions 17 (for computer 14) are stored on one or more of the respective computer-readable storage devices 830 for execution by one or more of the respective processors 820 via one or more of the respective RAMs 822 (which typically include cache memory). In the illustrated embodiment, each of the computer-readable storage devices 830 is a magnetic disk storage device of an internal hard drive. Alternatively, each of the computer-readable storage devices 830 is a semiconductor storage device such as ROM 824, EPROM, flash memory or any other computer-readable storage device that can store but does not transmit a computer program and digital information.

The set of internal components 800 also includes a R/W drive or interface 832 to read from and write to one or more portable computer-readable storage devices 936 that can store but do not transmit a computer program, such as a CD-ROM, DVD, memory stick, magnetic tape, magnetic disk, optical disk or semiconductor storage device. The program instructions 17 (for computer 14) can be stored on one or more of the respective portable computer-readable storage devices 936, read via the respective R/W drive or interface 832 and loaded into the respective hard drive or semiconductor storage device 830. The term "computer-readable storage device" does not mean a signal propagation media such as copper transmission cables, optical transmission fibers and wireless transmission media.

The set of internal components 800 also includes a network adapter or interface 836 such as a TCP/IP adapter card or wireless communication adapter (such as a 4G wireless communication adapter using OFDMA technology). The programs instructions 17 (for computer 14) can be downloaded to the respective computing/processing devices from an external computer or external storage device via a network (for example, the Internet, a local area network or other, wide area network or wireless network) and network adapter or interface 836. From the network adapter or interface 836, the programs are loaded into the respective hard drive or semiconductor storage device 830. The network may comprise copper wires, optical fibers, wireless transmission, routers, firewalls, switches, gateway computers and/or edge servers.

The set of external components 900 includes a display screen 920, a keyboard or keypad 930, and a computer mouse or touchpad 940. The sets of internal components 800 also includes device drivers 840 to interface to display screen 920 for imaging, to keyboard or keypad 930, to computer mouse or touchpad 940, and/or to display screen for pressure sensing of alphanumeric character entry and user selections. The device drivers 840, R/W drive or interface 832 and network adapter or interface 836 comprise hardware and software (stored in storage device 830 and/or ROM 824).

The programs can be written in various programming languages (such as Java, C+) including low-level, high-level, object-oriented or non object-oriented languages. Alternatively, the functions of the programs can be implemented in whole or in part by computer circuits and other hardware (not shown).

Based on the foregoing, a computer system, method and program product have been disclosed for enhancing a user authentication process. However, numerous modifications and substitutions can be made without deviating from the scope of the present invention. Therefore, the present invention has been disclosed by way of example and not limitation.

The invention claimed is:

1. A method for authenticating a user, the method comprising the steps of:

receiving, in a password field of a computer screen, keyboard entries from a user of (a) a series of alphanumeric characters forming part of a password of the user and (b) one or more function keys that either delete one or more of the alphanumeric characters or do not affect the alphanumeric characters as entered into the password field;

receiving a user entry to submit the password entered into the password field for authentication, and in response, determining, by one or more processors, whether logged keyboard entries of (a) and (b) made during entry of the password of the user into the password field match a stored, valid password for the user, such that the one or more processors consider the one or more function keys that either delete one or more of the alphanumeric characters or do not affect the alphanumeric characters as part of the submitted password which is compared to the stored valid password for authentication of the user;

while a cursor of the computer screen is positioned in a username field of the user, receiving keyboard entries from the user of (c) a series of alphanumeric characters forming part of a username of the user and (d) one or more function keys that either delete one or more of the alphanumeric characters or do not affect the alphanumeric characters as entered into the username field;

logging the key board entries of (c) and (d) made during entry of the username of the user into the username field; and receiving a user entry to submit the username entered into the username field; and subsequently, determining, by the one or more processors, whether the logged keyboard entries of (c) and (d) match a stored, valid username for the user, such that the one or more function keys that either delete one or more of the alphanumeric characters or do not affect the alphanumeric characters as entered into the username field are considered part of the submitted username which is compared to the stored valid username for the authentication of the user.

2. The method of claim 1, wherein the one or more function keys that do not affect the alphanumeric characters comprise a first function key that is pressed and released between entries of the alphanumeric characters such that the first function key is not entered into the password field.

3. The method of claim 1, wherein the keyboard entries from the user are received from a single keyboard.

4. The method of claim 3, wherein the single keyboard comprises a virtual keyboard.

5. The method of claim 1, wherein the keyboard entries from the user are received from multiple differing keyboards.

6. The method of claim 1, further comprising:

while the cursor of the computer screen is positioned in the password field of the user, receiving, from an input device, input entries from the user of (c) one or more functions that either deletes one or more of the alphanumeric characters or does not affect the alphanumeric characters as entered into the password field;

logging the input entry of (c) made during entry of the password of the user into the password field; and subsequently, determining, by the one or more processors, whether the logged keyboard entries of (a), (b), and (c) match the stored, valid password for the user, such that the one or more functions that either delete one or more of the alphanumeric characters or does not affect the alphanumeric characters as entered into the password field are considered part of the submitted password which is compared to the stored valid password for authentication of the user.

7. The method of claim 6, wherein the input device comprises a device selected from the group consisting of a keyboard, a mouse, and a touchscreen device.

8. The method of claim 6, wherein the one or more functions comprises a function selected from the group consisting of a backspace function, a shift function, a touchscreen function, and a mouse click action.

9. A computer program product for authenticating a user, the computer program product comprising:

one or more computer-readable storage devices and program instructions stored on one of the one or more storage devices, the program instructions comprising:

program instructions to receive keyboard entries from a user of (a) a series of alphanumeric characters forming part of a password of the user and (b) one or more function keys that either delete one or more of the alphanumeric characters or do not affect the alphanumeric characters as entered into a password field of a computer screen;

program instructions to receive the user entry to submit the password entered into the password field for authentication;

program instructions to, determine by one or more processors, whether logged keyboard entries of (a) and (b) match a stored, valid password for the user, such that the one or more processors consider the one or more function keys that delete one or more of the alphanumeric characters as part of the submitted password which is compared to the stored valid password for authentication of the user;

while a cursor of the computer screen is positioned in a username field of the user, program instructions to receive keyboard entries from the user of (c) a series of alphanumeric characters forming part of a username of the user and (d) one or more function keys that either delete one or more of the alphanumeric characters or do not affect the alphanumeric characters as entered into the username field;

program instructions to log the key board entries of (c) and (d) made during entry of the username of the user into the username field;

program instructions to receive a user entry to submit the username entered into the username field; and program instructions to subsequently determine, by the one or more processors, whether the logged keyboard entries of (c) and (d) match a stored, valid username for the user, such that the one or more function keys that either delete one or more of the alphanumeric characters or do not affect the alphanumeric characters as entered into the username field are considered part of the submitted username which is compared to the stored valid username for the authentication of the user.

10. The computer program product of claim 9, wherein the keyboard entries from the user are received from a single keyboard.

11. The computer program product of claim 10, wherein the single keyboard comprises a virtual keyboard.

12. The computer program product of claim 9, wherein the keyboard entries from the user are received from multiple differing keyboards.

13. The computer program product of claim 9, further comprising:

while the cursor of the computer screen is positioned in the password field of the user, program instructions to receive, from an input device, input entries from the user of (c) one or more functions that either deletes one or more of the alphanumeric characters or does not affect the alphanumeric characters as entered into the password field;

program instructions to log the input entry of (c) made during entry of the password of the user into the password field; and program instructions to subsequently determine, by the one or more processors, whether the logged keyboard entries of (a), (b), and (c) match the stored, valid password for the user, such that the one or more functions that either delete one or more of the alphanumeric characters or does not affect the alphanumeric characters as entered into the password field are considered part of the submitted password which is compared to the stored valid password for authentication of the user.

14. A computing system comprising a computer processor coupled to a computer-readable memory unit, said memory unit comprising instructions that when executed by the computer processor implements a method for authenticating a user, said method comprising:

receiving, in a password field of a computer screen, keyboard entries from a user of (a) a series of alphanumeric characters forming part of a password of the user and (b) one or more function keys that either delete one or more of the alphanumeric characters or do not affect the alphanumeric characters as entered into the password field;

receiving a user entry to submit the password entered into the password field for authentication, and in response, determining, by one or more processors, whether logged keyboard entries of (a) and (b) made during entry of the password of the user into the password field match a stored, valid password for the user, such that the one or more processors consider the one or more function keys that either delete one or more of the alphanumeric characters or do not affect the alphanumeric characters as part of the submitted password which is compared to the stored valid password for authentication of the user;

while the cursor of the computer screen is positioned in a username field of the user, receiving keyboard entries from the user of (c) a series of alphanumeric characters forming part of a username of the user and (d) one or more function keys that either delete one or more of the alphanumeric characters or do not affect the alphanumeric characters as entered into the username field;

logging the key board entries of (c) and (d) made during entry of the username of the user into the username field; and receiving a user entry to submit the username entered into the username field; and subsequently, determining, by the one or more processors, whether the logged keyboard entries of (c) and (d) match a stored, valid username for the user, such that the one or more function keys that either delete one or more of the alphanumeric characters or do not affect the alphanumeric characters as entered into the username field are considered part of the submitted username which is compared to the stored valid username for the authentication of the user.

15. The computing system of claim 14, wherein the one or more function keys that do not affect the alphanumeric characters comprise a first function key that is pressed and released between entries of the alphanumeric characters such that the first function key is not entered into the password field.

16. The computing system of claim 14, wherein the keyboard entries from the user are received from a single keyboard.

17. The computing system of claim 16, wherein the single keyboard comprises a virtual keyboard.

18. The computing system of claim 15, wherein the keyboard entries from the user are received from multiple differing keyboards.

19. The computing system of claim 15, wherein the keyboard entries from the user are received from a device selected from the group consisting of a keyboard, a mouse, and a touchscreen device.

20. The computing system of claim 14, further wherein said method further comprises:

while the cursor of the computer screen is positioned in the password field of the user, receiving, from an input device, input entries from the user of (c) one or more functions that either deletes one or more of the alphanumeric characters or does not affect the alphanumeric characters as entered into the password field;

logging the input entry of (c) made during entry of the password of the user into the password field; and subsequently, determining, by the one or more processors, whether the logged keyboard entries of (a), (b), and (c) match the stored, valid password for the user, such that the one or more functions that either delete one or more of the alphanumeric characters or does not affect the alphanumeric characters as entered into the password field are considered part of the submitted password which is compared to the stored valid password for authentication of the user.

\* \* \* \* \*